May 27, 1930.  W. J. O. JOHNSON  1,759,851
SAUSAGE LINKING MECHANISM
Filed April 26, 1928  5 Sheets-Sheet 1
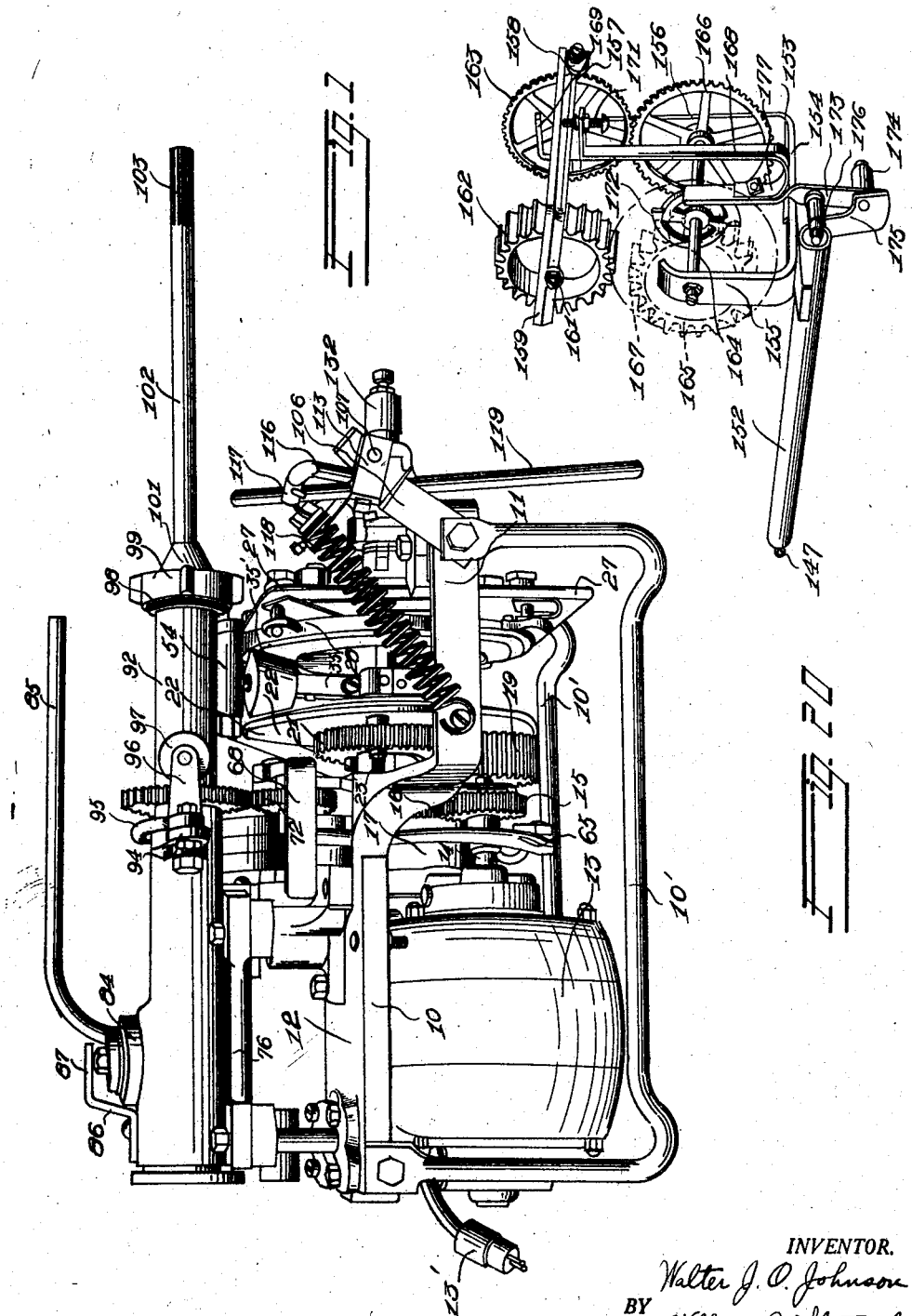
INVENTOR.
Walter J. O. Johnson
BY William A. Strauch
ATTORNEY

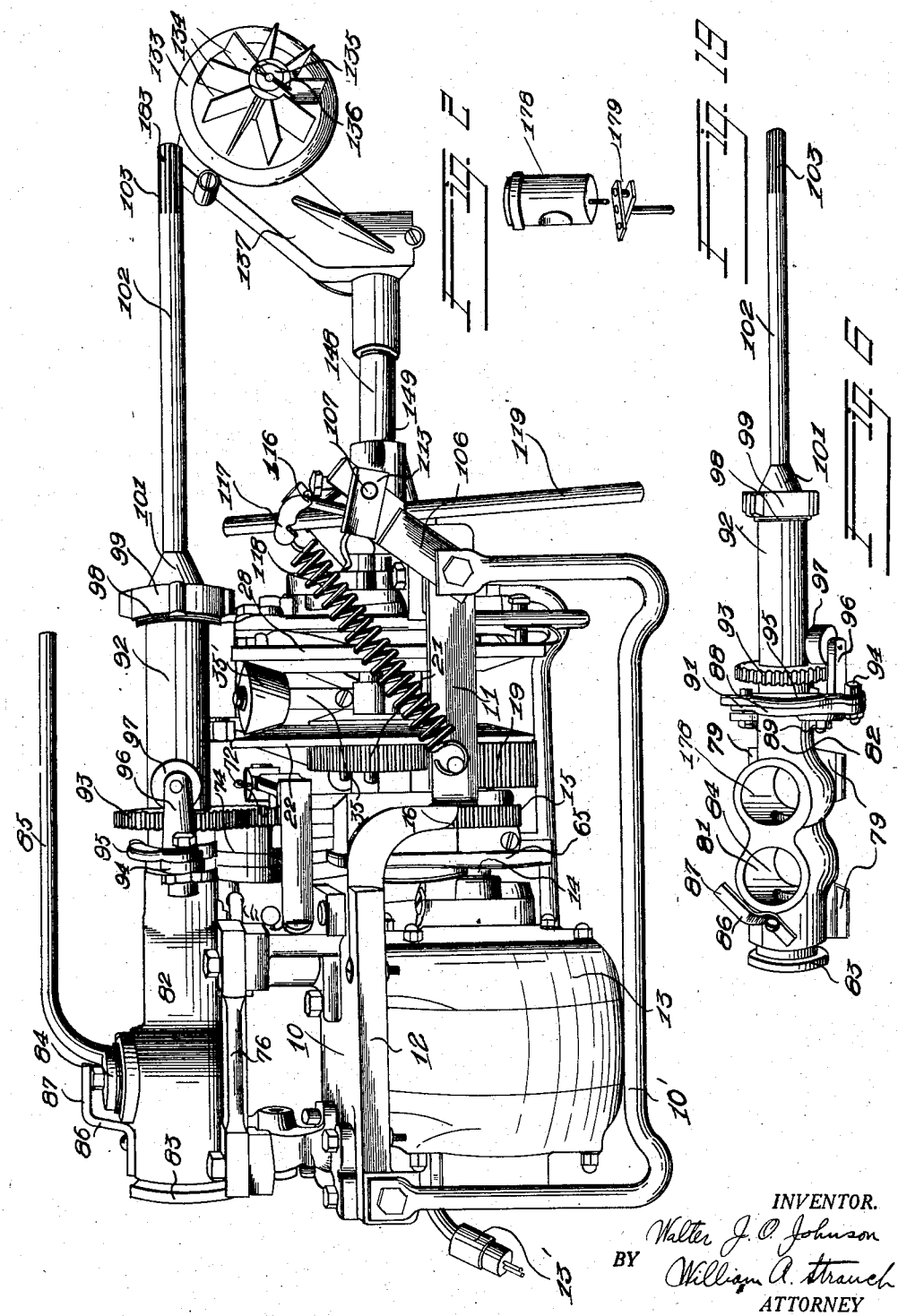

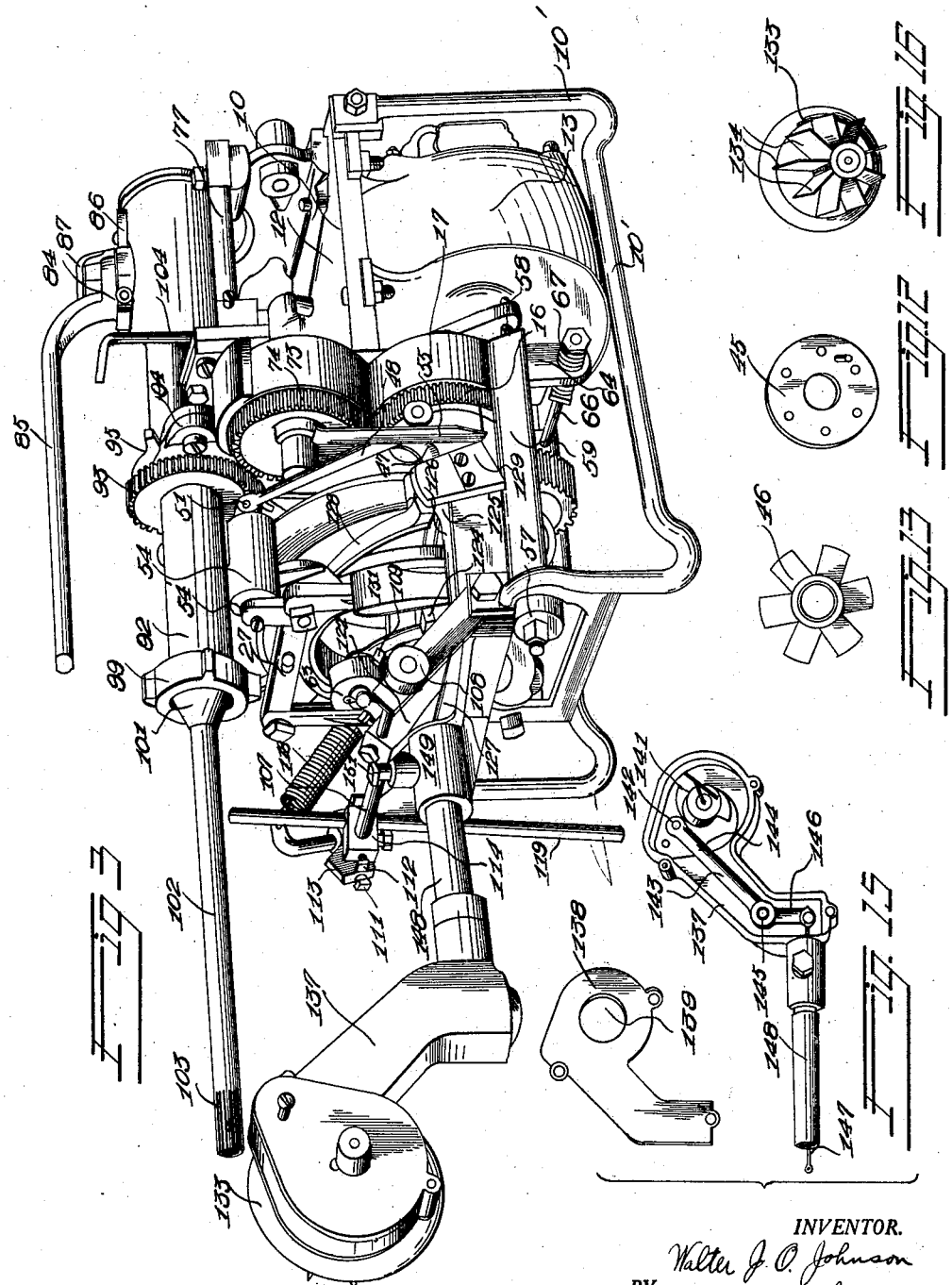

May 27, 1930.  W. J. O. JOHNSON  1,759,851
SAUSAGE LINKING MECHANISM
Filed April 26, 1928   5 Sheets-Sheet 4
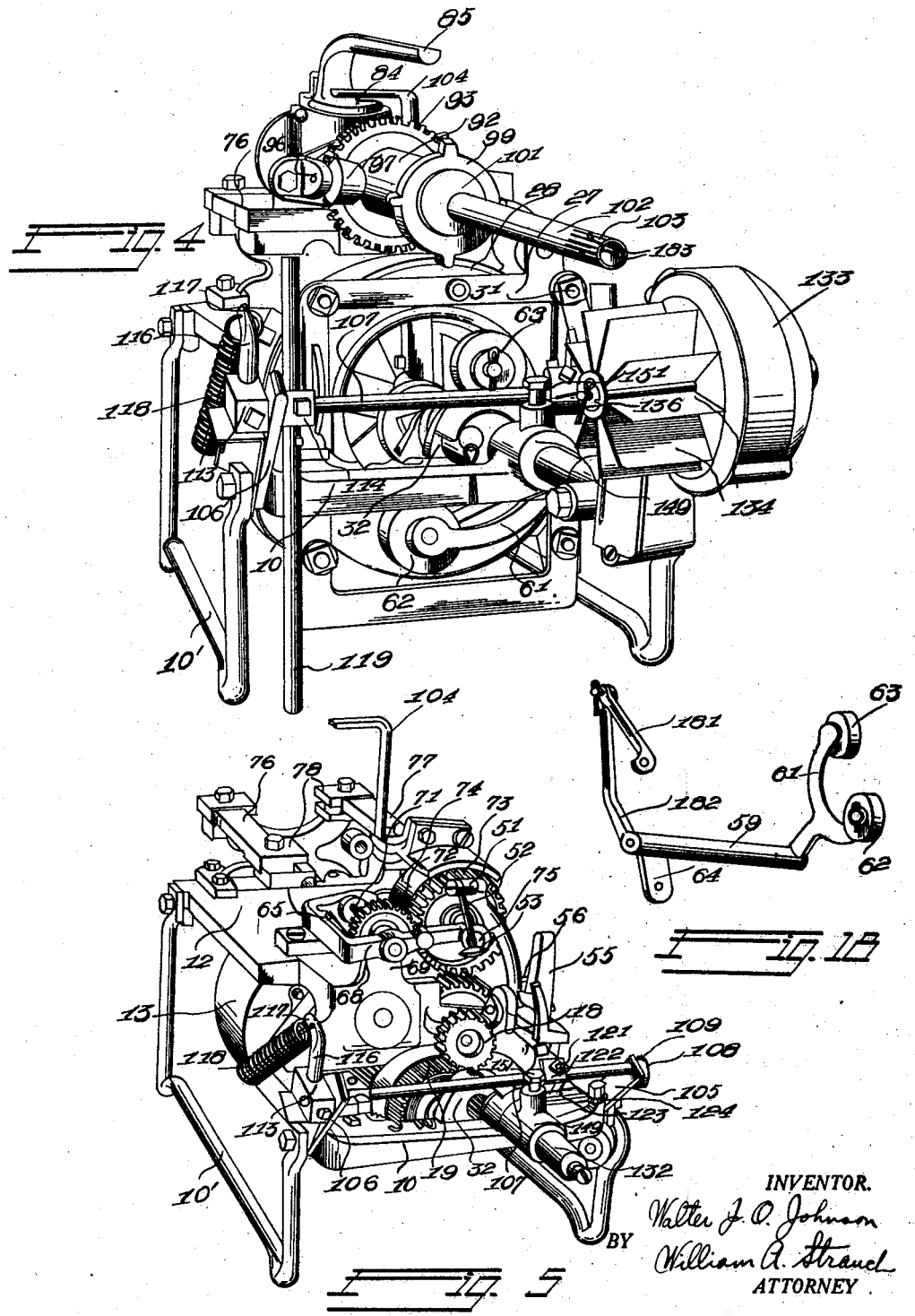
INVENTOR.
Walter J. O. Johnson
William A. Strauel
BY
ATTORNEY May 27, 1930. W. J. O. JOHNSON 1,759,851
SAUSAGE LINKING MECHANISM
Filed April 26, 1928 5 Sheets-Sheet 5
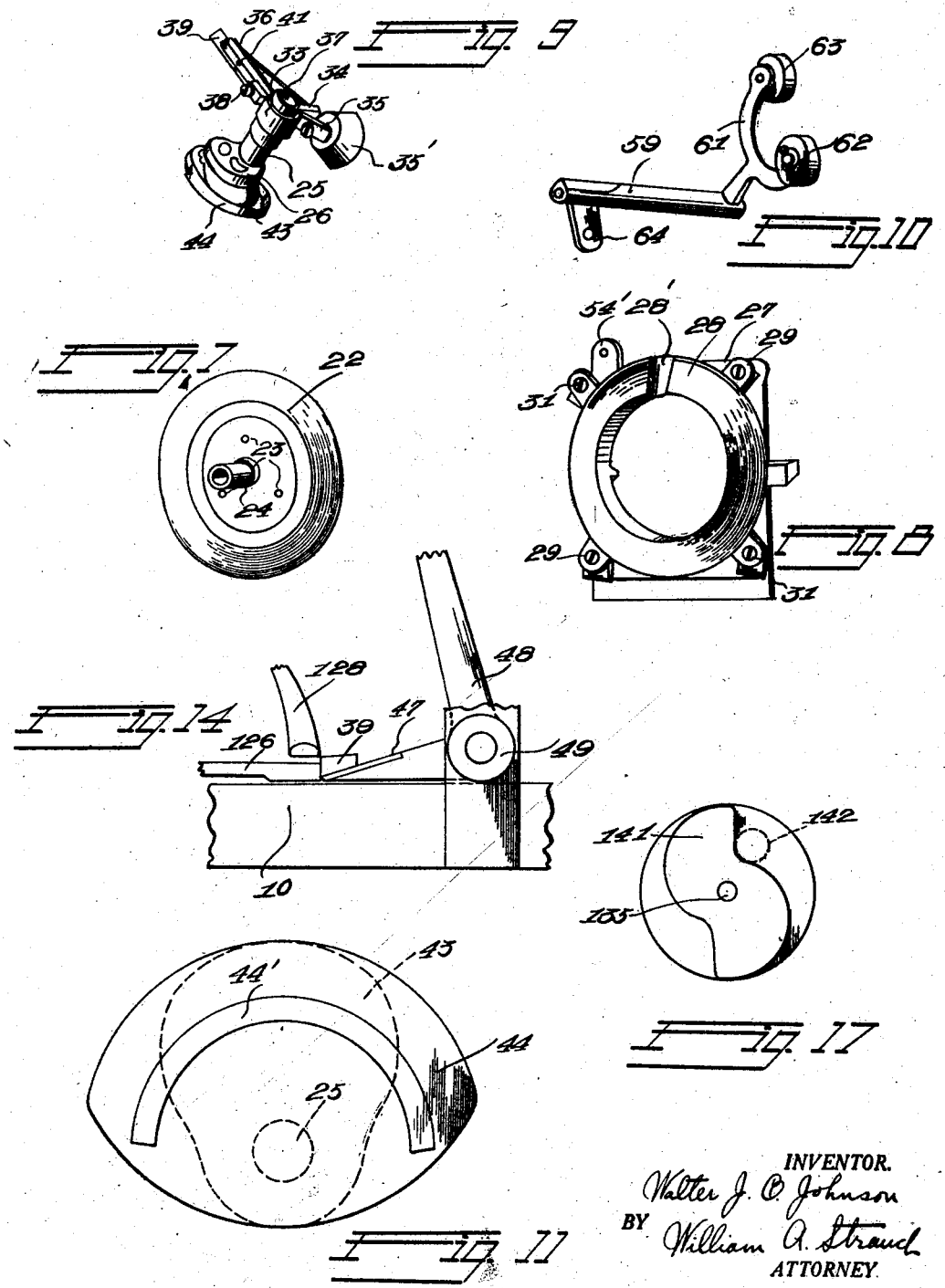
INVENTOR.
Walter J. O. Johnson
BY William A. Strauch
ATTORNEY.

Patented May 27, 1930

1,759,851

UNITED STATES PATENT OFFICE

WALTER J. O. JOHNSON, OF CHICAGO, ILLINOIS, ASSIGNOR TO THE ALLBRIGHT-NELL COMPANY, OF CHICAGO, ILLINOIS, A CORPORATION OF ILLINOIS

SAUSAGE-LINKING MECHANISM

Application filed April 26, 1928. Serial No. 272,964.

The present invention relates to automatic sausage linking mechanisms and more particularly the invention relates to attachments for sausage stuffers adapted to link sausage in substantially uniform lengths independently of variations in the casing diameters into which meat is stuffed.

Various forms of sausage linkers have been heretofore proposed for making substantially uniform length sausage, none of which have met substantial commercial success because of the severe conditions of operations to which such mechanisms are subjected in practice, and because of the fact that such prior mechanisms have been lacking in the durability, simplicity and reliability essential to success.

Accordingly a primary object of the invention is the provision of a simplified durable linking mechanism adapted for use as an attachment to the usual types of sausage stuffers, and to automatically twist the unfilled end of a sausage casing at intervals to produce links of substantially uniform length sausages independently of the diameter of the casing being filled.

Another object of the invention is the provision of a mechanism for linking sausages automatically adapted to be detachably supported on the outlet pipe of a sausage stuffer to permit sausage meat to be fed preferably uninterruptedly into intestines or sausage casings which are automatically twisted at predetermined intervals to form links of sausages.

It is another object of my invention to provide a sausage linking mechanism automatically controlled by sensitive solely mechanical means of durable construction and long life.

It is a further object of the present invention to provide a sausage linking mechanism automatically controlled by the movement of the filled casing through novel mechanical means.

A further object of the invention is the provision of a sausage linking mechanism adapted to be pneumatically controlled.

It is another object of my invention to provide a novel single revolution clutch mechanism useful in automatic linkers and in any other mechanism where a light trip release and stopping action of a comparatively heavy clutch mechanism is desired.

Still another object of my invention is to provide filling nozzles for sausage linking mechanisms arranged to permit the free and ready flow of meat into casings.

A further object of the present invention is to provide a sausage linking mechanism which is compact, comparatively simple in construction, durable, and efficient in operation.

Further important objects of my invention will become apparent from the detailed disclosures in the following specification and by reference to the accompanying drawings, in which—

Figure 1 is a perspective view of one form of my improved sausage linking mechanism in which the twisting operations are pneumatically controlled.

Figure 2 is a perspective view of one form of my improved sausage linker in which the twisting mechanism is mechanically controlled by movement of the filled sausage casings.

Figure 3 is a perspective view of the construction shown in Figure 2 as seen from the opposite side thereof.

Figure 4 is a perspective view of the construction shown in Figure 2 looking in the direction of the linking end thereof.

Figure 5 is a perspective view of the machine with parts removed to more clearly show the driving mechanisms.

Figure 6 is a perspective view of the sausage meat valve body of a modification of the invention utilizing an automatically controlled feed valve to arrest the flow of meat during twisting operations.

Figure 7 is a perspective view of a rotatable clutch disk member utilized in all forms of my invention.

Figure 8 is a similar view of a fixed coacting clutch member.

Figure 9 is a perspective view of a rotatable combined clutch and trip operating member.

Figure 10 is a perspective view of a rocking member adapted for cooperation with the cams carried by the member shown in Figure 9.

Figure 11 is a more or less diagrammatic illustration of the contour of cams shown in Figure 9.

Figure 12 is a perspective view of a coacting friction contact clutch disk.

Figure 13 is a plan view of my improved clutch disk contact spring member.

Figure 14 is a more or less diagrammatic view illustrating the clutch trip mechanism.

Figure 15 is a disassembled view in perspective of the clutch trip controlling mechanism operated by sausage casing revolved means.

Figure 16 is a perspective view of the sausage casing guiding and contacting means for operating the trip controlling mechanism.

Figure 17 is a face view of the cam shown in Figure 15.

Figure 18 is a perspective view of a unitary feeding and linking control member used only in the form of invention shown in Figure 6.

Figure 19 is a perspective view of an automatically operated feed control valve used only in the form of invention shown in Figures 6 and 18.

Figure 20 is a perspective view of a modified form of sausage casing guiding and clutch trip controlling mechanism.

Referring to the drawings by reference characters, in which like characters designate like parts, 10 designates a frame which as shown comprises an open end operating mechanism supporting section 11 and an elevated table section 12, the sections 11 and 12 being supported by suitable legs 10'. Suitably supported under table section 12 is an electric motor 13 provided with an attaching power plug 13' and a driving shaft 14 (Figure 1) on the end of which is supported a pinion 15 driven thereby which meshes with and drives a gear 16. Gear 16 is concentric with and imparts rotation to a friction drum 17 secured thereto.

Carried and driven by the shaft on which gear 16 is mounted is a pinion 18 (Figure 5) which meshes with gear 19 in turn meshing with gear 21 (Figures 1 and 2) which is fixedly secured to disk 22 (Figures 1, 2 and 7) by studs 23 thereby imparting rotation to disk 22 upon rotation of gear 21. Disk 22 is provided with a tubular extension 24 (Figure 7) which forms a bearing for the disk and telescopes into hub portion 25 (Figure 9) of the cam member 26. It will thus be seen that when motor 13 is driven the disk 22 through the described train of gears is continuously rotated.

A frame member 27 (Figure 8) is connected to frame 10 adjacent disk 22 and a friction roller contact member 28, is yieldably secured to frame member 27.

Disk 22 and member 28 as is shown in Figures 1 and 2, are in relatively close spaced relation and have their opposing faces flared outwardly thus defining top end roller engaging surfaces. Member 28 is provided with a plurality of ears 29 through each of which is extended a securing bolt 31 into an adjacent corner of frame 27, and a U-shaped leaf spring is held between each ear 29 and frame member 27 by bolt 31 to yieldably support member 28 from frame 27. The shaft which carries gear 21 passes through extension 24 of disk 22 and the opening in member 28, and has a bearing in extension 32 of frame 10.

Cam member 26 is rotatably mounted on the shaft carrying gear 21 with extension 24 telescoped in hub 25 thereof. Cam member 26 comprises a cylindrical member 33 within which hub 25 extends and revolves. Member 33 has rigidly secured thereto a frame 34 which comprises substantially right angularly related arms 35 and 36 connected by bracing bar 37. Rotatably secured on the outer end of arm 35 is a roller 35' of truncated conical form and pivotally secured to arm 36 as at 38 is a trigger 39 which normally engages a stop 41 carried by arm 36. Supported on the outer end of hub 25 is a pair of frame actuating cams 43 and 44 of the form and relation illustrated in Figure 11. Cam member 26 when assembled has arms 35 and 36 thereof disposed between disk 22 and member 28 with hub 25 projecting through the open center of member 28 and cams 43 and 44 disposed outwardly of member 28. A friction disk 45 (Figure 12) is slidingly secured to hub 25 against rotation relative thereto and is held in frictional engagement with disk 22 by means of the plural leaf spring member 46 (Figure 13) which is also secured to hub 25, the disk 45 and spring member 46 bearing between member 33 and disk 22. Trigger 39 in neutral inoperative position of cam member 26 rests upon an inclined platform 47 (Figure 14) integral with an arm 48 in which position roller 35' rests in groove 28' in member 28 out of engagement with constantly revolving disk 22. Arm 48 is pivotally supported at one end thereof adjacent platform 47 on a lug 49 carried by frame 10.

The outer end of arm 48 has pivotally secured thereto as at 51 a piston rod 52 which carries a piston 53 mounted slidably within an air cylinder 54 which is secured to an upstanding lug 54' carried by frame 27. Connected to frame 10 is one arm of a U-shaped leaf spring 55 the opposite arm of which is connected to arm 48 by a connecting element 56, the piston 53, and cylinder 54 and spring 55 function co-operatively to ease the impact of trigger 39 upon engagement with platform 47.

Pivotally connected at opposite ends thereof to frame 10 as at 57 and 58 is a bar 59 supporting from one end thereof a yoke member 61 which rotatably supports a pair of spaced rollers 62 and 63 in alinement with cams 43 and 44 respectively. Bar 59 carries at the opposite end thereof an arm 64 which is flexibly connected to the lower end of a curved arm 65 by means of a link 66 having a yieldable connection with arm 64 through a coiled spring 67.

The upper end of arm 65 is rigidly connected to a frame 68 (Figure 5) rockingly supported on projections 69 of frame 10 by means of a shaft 71 extending transversely of frame 68. Rotatably mounted on shaft 71 is a pinion 72 constantly in mesh with a gear 73 concentric with and connected to a drum 74, the gear 73 and drum 74 being rotatably supported on a shaft 75 carried by frame 68.

Mounted on table 12 in vertical spaced relation thereto is a pair of longitudinally extending transversely spaced bars 76 and 77 (Figure 5) provided with inwardly facing projections 78 under which are detachably supported outwardly projecting wings 79 of a valve body 81 which comprises an elongated chamber 82 having a flanged end member 83 for detachable connection with a sausage stuffer and provided with a rotatable valve 84 in said chamber adjacent member 83, valve 84 being provided with a manual operating handle 85 and pivotally supported on chamber 82 intermediate member 83 and valve 84 is a lever 86 having an arm 87 adapted in closed position to engage the outer end of valve 84 in operation position. Chamber 82 at the opposite end is provided with a flange 88 to which is detachably secured by means of bolts 89 a flange 91 provided with an outwardly extending nipple (not shown). Detachably telescoped over the nipple is one end of a cylindrical meat discharge member 92 having fixed thereto a gear 93 constantly in mesh with pinion 72.

Pivoted to flange 91 as at 94 is a curved lever 95 provided with an arm 96 having pivotally secured to the end thereof a roller 97 which normally rotatably bears against a face of gear 93 to maintain member 92 in position on the nipple. By swinging lever 95 outwardly arm 96 is swung therewith and roller 97 thrown from in front of gear 93 thus permitting ready removal of member 92 for cleansing or other purposes.

The outer end of member 92 is externally threaded as at 98 for engagement by an internally threaded coupling member 99 for drawing flared head 101 of nozzle 102 into firm contact with the end of member 92. The outer end of nozzle 102 is provided with longitudinally extending grooves 103 for facilitating the telescoping of the sausage casings therewith as well as assisting in the twisting operation.

A bar 104 is removably extended through mating apertures in one of the projections 78 of bar 77 and the corresponding wing 79 of valve body 81 for holding the valve body against longitudinal displacement relative to bars 76 and 77.

Secured to opposite sides of frame 10 at the front end thereof is a pair of forwardly and outwardly projecting brackets 105 and 106 in the outer ends of which the opposite ends of a shaft 107 are rotatably mounted. One end of shaft 107 outwardly of bracket 105 is provided with a collar 108 detachably held in position by a set screw 109, collar 108 limiting movement of shaft 107 in one direction. The opposite end of shaft 107 has detachably secured thereto by means of set screws 111 and 112 apertured blocks 113 and 114 respectively on opposite sides of bracket 106 which limit movement of shaft 107 in both directions. Detachably secured in block 113 by set screw 115 is the shank of a finger 116 provided with an outer curved end 117. A helical tension spring 118 has one end thereof secured to end 117 and the opposite end secured to frame 10, spring 118 tending to revolve shaft 107 in a direction toward the operating mechanism. A foot or leg controlled lever 119 is extended through the aperture in block 112 with the lower end thereof in engagement with the floor or other support for holding shaft 107 against rotation under the action of spring 118.

Fixed to shaft 107 by bolt 121 intermediate the ends thereof is a bar 122 which at its free or inner end carries a pivot member 123 to which is pivoted as at 124 the apex of a bell crank lever 125 comprising arms 126 and 127. The end of arm 126 during the non-linking or non-twisting intervals rests in front of trigger 39 which during the same intervals rests on platform 47, arm 126 in said position resting under guide 128 held in position by a plate 128 secured to frame 10. A U-shaped spring 131 has one leg thereof secured to arm 126 in a manner urging it into position in front of trigger 39, the other leg of spring 131 being suitably secured to frame 10.

In the form of invention shown in Figure 1, the end of arm 127 is flexibly connected to a time controlled pneumatic dash pot 132 which controls the movement of lever 125 for moving arm 126 from in front of trigger 39 to release the clutch and to set the twisting mechanism into operation as is hereinafter more fully described. As the intestine or casings into which the sausage meat is fed vary in diameter it is obvious that by a time controlled means such as dash pot 132 sausage links of uniform length with variably diameter casings will not be produced for the reason that though uniform quantities of meat be fed into the casing during equal intervals of time the lengths of the links will vary in accordance with the variation in diameter of the casings being filled. When, however, uniform diameter casings are utilized such for example as artificial casings this mechanism will produce substantial uniform length links.

The invention in its preferred embodiments comprehends means automatically controlled by the movement of the sausage casings for producing sausage links of approximately uniform length independently of natural variations in casing diameters. Such means comprises a guide wheel 133. (Figure 2, 3, 4, 16) provided with a plurality of radially disposed impelling vanes 134 over which the sausage casing moves from the nozzle 102 under the influence of the pressure exerted by the meat upon being fed into the casing. Wheel 133 is rotatably mounted on a fixed shaft 135 being maintained thereon by a cotter 136. Shaft 135 is supported in a housing 137 provided with a detachable cover plate 138 having an opening 139 through which shaft 135 extends, housing 137 being disposed adjacent wheel 133. Concentrically fixed on hub of wheel 133 and rotatable therewith on shaft 135 within housing 137 is a duplex cam 141 (Figure 17) mounted for engagement with a roller 142 rotatably supported on the end of the longer arm 143 of a bell crank lever 144 pivoted at 145 to housing 137, the shorter arm 146 of which has flexibly secured to the end thereof one end of a rod 147 which extends through a tubular member 148 detachably secured within a tubular extension 149 of frame 10 by means of a bolt 151. Extension 149 is disposed adjacent arm 127 of lever 125 and the opposite end of rod 147 is flexibly connected to the end of arm 127.

While the guiding and measuring wheel 133 above described forms through the rotation thereof, by engagement therewith of the sausage casings sausage, links of substantially uniform length, it has been found that the sausage casings upon passing over vanes 136 are not of sufficient weight to positively rotate wheel 133 commensurate with the forward movement of the casings and consequently my invention comprehends a modified form of guiding and measuring means of a more positive character. The modified form of guiding and measuring means is illustrated in Figure 20 and comprises a tubular member 152 for detachable connection with extension 149 and has rigidly secured to one end thereof a bracket 153 which comprises a base 154 an upwardly extending relatively short bar 155 and an upwardly extending relatively long bar 156 integrally connected to the opposite ends of base 154. The upper end of bar 156 is provided with a transversely extending bar 157 provided with an ear 158 on each end thereof. Pivotally secured between ears 158 is one end of an open rectangular frame member 159. Journaled in the opposite ends of frame member 159 is a shaft 161 which at one end has fixed thereto a measuring wheel 162 and at the opposite end has fixed thereto a gear 163, wheel 162 and gear 163 being disposed within frame member 159. Extending through the upper end of bar 155 and an intermediate portion of bar 156 is a shaft 164 to one end of which is fixed a measuring wheel 165 in vertical alinement with wheel 162 and to the opposite end of which is fixed a gear 166 in mesh with gear 163. Measuring wheels 162 and 165 are of like dimensions as are also gears 163 and 166 and the sausage casing during operation is fed between wheels 162 and 165 being retained against lateral movement in one direction by a flange 167 carried by wheel 165 and as wheels 162 and 165 are connected through gears 163 and 166 for uniform rate of rotation there is no possibility of either measuring wheel slipping relative to the sausage casing.

The upper wheel 162 constantly bears upon the moving casing since it is carried by the free ends of frame 159 whose opposite end is pivotally secured to lugs 158. Secured to base 154 and extending upwardly therefrom is a bar 168 which supports a stop member 169 for limiting upward movement of frame 159 and an adjustable stop member 171 for limiting downward movement of frame 159. Secured to shaft 164 intermediate the ends thereof is a duplex cam 172 adapted to bear against an anti-friction roller (not shown) carried by the outer end of an arm 173 pivotally connected to an extension 174 carried by a projection 175 of base 154. Arm 173 adjacent its pivotal connection is provided with an extension 176 to which the end of bell crank actuating rod 147 is secured, rod 147 extending through tubular member 152. Interposed between arm 168 and the upper end of arm 173 is a leaf spring 177 for yieldingly urging the roller carried by arm 173 into engagement with duplex cam 172.

In the machine so far described the feed of sausage meat into the casing is controlled by the single manually controlled valve 84 and the meat is constantly fed into the casing during the linking or twisting operations and this is the preferable form of apparatus. My invention is, however, readily adapted for the use of an automatic valve to arrest the flow of meat during twisting operations as shown in Figures 6, 18 and 19. Such modified mechanism comprises a valve 178 operable through a rocker arm 179 which in turn is operated through a link 181 (Figure 18) pivotally carried by an arm 182 rigidly carried by bar 59 that the twisting and feeding operations are carried out alternately.

It has been found during operation of the machine that when the meat is fed into the machine the casing which is crowded over the nozzle the meat has a tendency to press back and hold the casing too tight to permit the free movement of the casing over the nozzle which is necessary for an efficient operation of the machine. In order to overcome this pressing back tendency a plurality (preferably three) of relatively small holes 183 are drilled in the end of nozzle 102 approximately one inch from the extremity thereof which permit a little meat pressure to come in against the casing and thereby facilitates the forward uniform movement of the casing and meat carried therein. This feature of my invention is obviously applicable to the nozzles of other types of linkers.

In the operation of the machine an intestine or casing is crowded over nozzle 102. This is facilitated by the grooves 103 in the nozzle. The motor 13 is then driven and handle 85 is manually actuated to operate valve 84 putting meat under pressure in the stuffer into communication with the nozzle 102 permitting meat to be constantly fed under pressure into the casing carried by nozzle 102. The casing in all forms of my invention is guided by the hands of an operator in its movement from nozzle 102. Motor 13 being in operation imparts rotation to pinion 15 which through gear 16 with which it meshes imparts rotation to friction drum 17. Pinion 18 carried by the shaft which carries gear 16 meshing with gear 19 which in turn meshes with gear 21 imparts rotation to clutch disk 22. Thus friction roller 17 and disk 22 are constantly rotating while the sausage meat is being constantly fed into the casing.

In the form of invention shown in Figure 1, at predetermined intervals dash pot control 132 is pneumatically operated and actuates bell crank lever 125 throwing arm 126 thereof out of engagement with trigger 39 whereupon the friction between disks 22 and 45 is sufficient to move trigger 39 out of engagement with platform 47 upon pivoting about its pivot 38 and as a consequence roller 35' is advanced forward out of engagement with groove 28' and brought into engagement with constantly rotating disk 22 which carries roller 35' as well as trigger 39 through one complete revolution at the end of which roller 35' again seats in groove 28' and trigger 39 which has been restored to its original position against stop 41 again engages platform 47, the impact of engagement being cushioned by piston 53 and chamber 54 as well as leaf spring 55.

During the revolution of roller 35' and trigger 39 cams 43 and 44 are brought into contact with the respective rollers 62 and 63 which through yoke 61 imparts a rocking motion to bar 59 which in turn through link 66 and arm 65 rocks frame 68 bringing friction drum 74 into frictional engagement with constantly rotating drum 17 imparting rotation to drum 74. Drum 74 in turn drives gear 73 which through pinion 72 meshing with gear 93 imparts rapid rotation to nozzle 102 as well as the casing carried thereby causing the casing to twist adjacent the end of nozzle 102 between the revolving and filled portions of the casing while the sausage meat is being constantly fed into the casing. About two and one half twists in the casing is sufficient and the twists are formed in such short intervals of time that the constant feed of meat into the casing does not interfere therewith. This is an important and novel feature of this form of my invention. As soon as the twists are formed cams 43 and 44 actuate rollers 62 and 63 to rock frame 68 in shaft 71 throwing drum 17 thus arresting rotation of nozzle 102.

The described operations are successively repeated, the twisting mechanism being periodically set into operation through dash-pot control 132 while the meat is being constantly fed into nozzle 102 thus forming links of sausage. As one casing is filled, another is put into position on nozzle 102 and the holes 183 to facilitate the forward movement of casing from nozzle 102.

In the forms of inventions wherein the timing wheel control is employed the filled casing moves over the vanes 134 of wheel 133 which imparts rotation to duplex cam 141 which in turn through engagement with roller 142 imparts movement to arm 146 of lever 143. Arm 146 through rod 147 moves arm 127 of bell crank lever 125 throwing arm 126 thereof out of engagement with trigger 39 whereupon roller 35' is brought into engagement with revolving disk 22 and nozzle 102 is caused to revolve as above set forth.

In the use of measuring wheel 133 it will be seen that, since the wheel must always be rotated uniform distances before table 68 is rocked through cam 141 and intervening parts, sausage links of uniform length will be produced. As roller 142 engages two similar high points on cam 141 during each revolution of wheel 133, nozzle 102 will be set into revolving operation twice during each revolution of wheel 133 producing two links of sausage during each revolution. A spring 131 tends to release trigger 39 from engagement with platform 47 which is controlled by cam 141 and associated mechanism.

Bell crank lever 125 is returned to the lock position in front of trigger 39 by means of a concentrically curved cam 44' on outer face of cam 44, as shown in Figure 11. Roller 142 is pressed against the inclined surfaces of cam 141 by means of spring 131 pressing outwardly on bell crank lever 125 and as cam 141 revolves roller 142 approaches the center thereof allowing lever 126 to gradually move to the trip position. When roller 142 rolls to position shown in Figure 17, lever 126 has passed from in front of trigger 39 and trigger 39 slides off inclined platform 47 allowing machine to trip. When cam 44 revolves the cam 44' on its outer face throws the transverse end of lever 125 outward, thus lever 126 inward to lock position in front of trigger 39.

In the spacing arrangement shown in Figure 20 the sausage casing passes between wheels 162 and 165 imparting rotation to cam 172 which through engagement with the roller carried by arm 173 imparts movement to rod 147 which in turn actuates bell crank lever 125 as above set forth. In this form of spacing arrangement however cam 172 is more positively actuated through the moving sausage casing than in the form above described since the casing is held into firm engagement with wheels 162 and 165.

In the use of the automatically operated valve 178 whereby the feed of meat is regulated and permitted to be fed into the casing between the successive twisting operations and discontinued during the twisting operations the valve is actuated through arm 182 link 181 and rocker arm 179 to close valve 178 at the time nozzle 102 is set into revolving operation through engagement of rollers 62 and 63 with cams 43 and 44. At the end of each successive twisting operation frame 68 upon rocking movement thereof to disengage drums 17 and 74 valve 78 is again opened through connections 65, 66, 64, 179, 181 and 182 again permitting the feed of meat into nozzle 102 and consequently the casing carried thereby.

Should it be desired to release trigger 39 at the beginning of an operation or at any other time rod 119 is removed permitting shaft 107 to be revolved through the influence of spring 118 rocking lever 125 about connection between arm 127 and rod 147 as a pivotal point to retract arm 126 from engagement with trigger 39 and thus set the twisting mechanism into operation.

From the foregoing description it will be seen that a sausage linking machine is provided whereby the twisting mechanism is automatically set into operation by mechanical means at predetermined intervals to produce sausage links of uniform length and whereby the linking operation in the preferred embodiment of the invention is carried out while the sausage meat is continuously and uninterruptedly fed into the sausage casings.

While I have disclosed certain specific embodiments of my invention it is to be understood that my invention is not limited thereto but comprises such changes and alterations as will be apparent to those skilled in the art, or such as fairly fall within the scope of the appended claims.

Accordingly, what I desire to secure by Letters Patent and claim as new is:—

1. A sausage linking mechanism comprising a rotatable nozzle adapted to receive a sausage casing over the free end thereof and through which sausage meat is constantly fed from said stuffer; and means including friction driving elements for intermittently rotating said nozzle at a rate permitting the constant feed of the meat.

2. A sausage linking mechanism comprising a rotatable nozzle adapted to receive a sausage casing over the free end thereof and through which sausage meat is constantly fed under pressure into said casing; a rotatable element actuated by the filled casing; and means including friction driving element controlled by said rotatable element for intermittently smoothly rotating said nozzle at a rate permitting a constant feed of said meat.

3. In a sausage linking machine; a rotatable tubular nozzle adapted to receive a sausage casing over the free end thereof and through which sausage meat is constantly fed under pressure; and means for facilitating the movement of said casing from said nozzle upon the feeding of meat thereinto comprising apertures through the wall of said nozzle adjacent the discharge end thereof.

4. In combination with a sausage stuffer; a sausage linking machine comprising a rotatable nozzle adapted to receive a sausage casing over the free end thereof; means to control the flow of meat from said stuffer into said nozzle; means to impart smooth intermittent rotation to said nozzle; mechanical means actuated by the formed sausage for controlling said nozzle rotating means; and means for smoothly starting and stopping said last named means.

5. A sausage linking mechanism adapted for detachable connection with a sausage stuffer; comprising a rotatable nozzle adapted to receive a sausage casing over the free end thereof and into which sausage meat is fed under pressure from said stuffer; rotatable elements actuated by the movement of the filled casing; means for inter-connecting said elements for simultaneous movement; and mechanical means actuated by said rotatable element for intermittently smoothly starting rotating and stopping said nozzle.

6. The construction set forth in claim 5 in which said nozzle rotating means comprises a constantly rotating drum; a second rotatable drum normally out of engagement with said first drum; driving connections between said second drum and said nozzle; a cam member controlled by said rotatable element and means actuated by said cam member for moving said drums into frictional driving engagement having a line driving contact.

7. A sausage linking mechanism adapted for connection with a sausage stuffer comprising a rotatable nozzle adapted to receive a sausage casing over the free end thereof; means to admit sausage meat from said stuffer into said nozzle and casing under pressure; power generating means; a friction drum constantly rotated by said power generating means; a second rotatable friction drum normally out of engagement with said first drum; driving means operatively associated with said nozzle and said second drum; trip means for throwing said drums into engagement; and means actuated by movement of the filled casing for operating said trip means.

8. A sausage linking mechanism for detachable connection to a sausage stuffer comprising a sausage casing supporting and filling means; means for continuously feeding sausage meat under pressure through said supporting and filling means into said casing; and mechanical means controlled by the movement of the filled casing from said supporting and filling means for periodically imparting rotation to said supporting and filling means, and for smoothly starting and stopping the rotation thereof.

9. A sausage linking machine comprising a frame; a valve body supported by said frame for connection with a sausage stuffer, a rotatable nozzle detachably connected to said valve body for transporting sausage meat from said stuffer into a sausage casing carried thereby; a motor supported by said frame; a friction drum continuously rotated by said motor; a second friction drum rotatably supported by a rocking member pivotally supported by said frame; said second drum normally out of engagement with said first drum; driving connections between said nozzle and said second drum; a rotatable roller engaging disk supported by said frame and continuously rotated by said motor; a fixed roller engaging member supported by said frame in cooperative relation to said rotatable roller engaging disk; means for intermittent engagement with said rotatable roller engaging disk and said fixed roller engaging member for rocking said rocking member for throwing said second drum into engagement with said first drum for imparting rotation to said nozzle; and means operable by the movement of the filled casing for setting said last means into operation.

10. The construction set forth in claim 9 in which said means for rocking said rocking member comprises a member provided with a roller a trigger and a plurality of cams, means for holding said member in frictional engagement with said rotatable disk; an inclined stop member against which said trigger normally rests with said roller out of engagement with said rotatable disk; a member pivotally carried by said frame; rollers carried by said last member; a connection between said last member and said rocking member; a lever normally holding said trigger in engagement iwth said stop member; said lever adapted to be actuated by said casing operated means for releasing said trigger whereupon said roller is advanced between said rotatable disk and said fixed member for a complete revolution thereof; whereupon said cams engage said rollers imparting movement to said member pivotally carried by said frame and drawing said second roller into engagement with said first roller.

11. The construction set forth in claim 9 in which said last named means comprises a rotatable member actuated by the filled casing; means engaging the filled casing to prevent slipping between said casing and rotatable member and elements operatively connecting said member and means.

12. A sausage linking machine for connection with a sausage stuffer comprising rotatable sausage casing supporting and filling means; rotatable means engaged by the filled sausage casing; a rotatable cam actuated by said rotatable means; and means controlled by said cam for intermittently smoothly starting and stopping rotation to said rotatable sausage casing supporting and filling means.

13. A sausage linking machine comprising rotatable sausage casing supporting and filling means; means for yieldingly intermittently imparting rotation to said rotatable sausage casing supporting and filling means; and means to smoothly stop and start said last named means.

14. A sausage linking machine comprising a sausage casing supporting and filling means; means for intermittently imparting yielding rotation to said first means; means for yieldingly stopping said last means; and means operable by the filled sausage casing for releasing said stopping means.

15. The structure set forth in claim 14 in which said last means comprises a pair of spaced sausage casing guide wheels; means inter-connecting said guide wheels for simultaneous rotation; a cam operable by one of said wheels; and flexible means actuated by said cam for operating said stopping means.

16. A sausage linking machine adapted for connection with a sausage stuffer comprising rotatable sausage casing supporting and filling means; means for yieldingly imparting rotation to said casing supporting and filling means and for yieldingly starting and stopping the same; means for admitting sausage meat from said stuffer into said casing supporting and filling means; and mechanical means controlling the yielding starting and stopping of said first named means.

17. A sausage linking machine comprising rotatable sausage casing supporting and filling means; a continuously rotating friction drum; a second rotatable friction drum normally out of contact with said first drum; means operable by the filled sausage casing for intermittently throwing said second drum into tangential contact with said first drum at intervals corresponding to uniform lengths of said filled casing for imparting yielding rotation to said rotatable casing supporting and filling means for forming sausage links of uniform lengths.

18. A sausage linking machine comprising a frame; rotatable sausage casing supporting and filling means supported by said frame; normally inoperative driving means associated with said casing supporting and filling means; continuously operated driving means supported by said frame; guiding and measuring means operable through contact therewith of the filled sausage casing; and means actuated by said guiding and measuring means for throwing said normally inoperable driving means into frictional operating engagement with said continuously operated driving means for imparting yielding rotation to said casing supporting and filling means at intervals corresponding to uniform lengths of the moving filled sausage casing from said supporting and filling means for forming sausage links of uniform lengths.

19. A sausage linking machine adapted for connection to a continuously operating sausage stuffer, comprising a rotatably mounted nozzle arranged to receive the sausage meat from said stuffer, and mechanism including elements arranged to be brought intermittently in yielding tangential engagement for rotating said nozzle at intervals at a rate of speed sufficient to permit uninterrupted operation of the flow of meat from said stuffer.

20. The combination defined in claim 19 including frictionally driven means controlled by the linked sausage for causing the engagement and disengagement of said elements at intervals determined by the length of the links.

21. A sausage linking machine comprising a rotatably mounted nozzle arranged to receive sausage meat continuously; mechanism to yieldingly rotate said nozzle at intervals, and means including elements in yielding frictional driving engagement for causing the starting and stopping of said mechanism.

22. The combination defined in claim 21 including elements operated by the formed links for controlling the operation of said last named means in accordance with the length of said links and the rate of their formation.

23. A sausage linking machine comprising a rotatably mounted nozzle, mechanism to rotate said nozzle comprising a pair of drums arranged to be brought intermittently in tangential contact; means to yieldingly bring said drums into contact at intervals and to yieldingly stop the movement of said means whereby sausage casings may be twisted at intervals without tearing caused by abrupt operation of said means and mechanism.

24. The combination defined in claim 23 including elements moved by the linked sausage to smoothly control the intervals of operation of said last named means.

In testimony whereof I affix my signature.

WALTER J. O. JOHNSON.